Nov. 4, 1958 A. E. BRICKMAN 2,858,708
FLEXIBLE CONDUIT
Filed Feb. 16, 1954 2 Sheets-Sheet 1
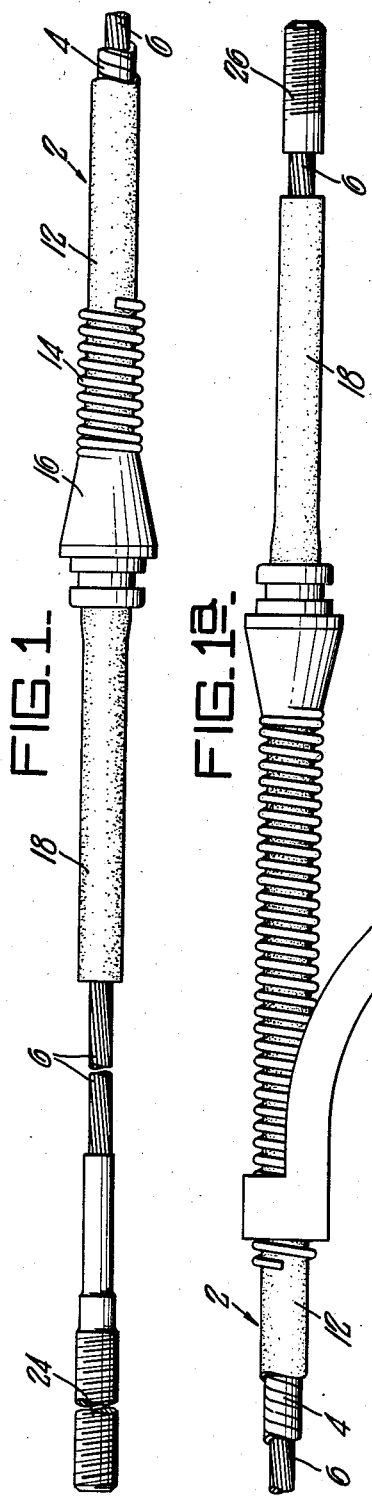
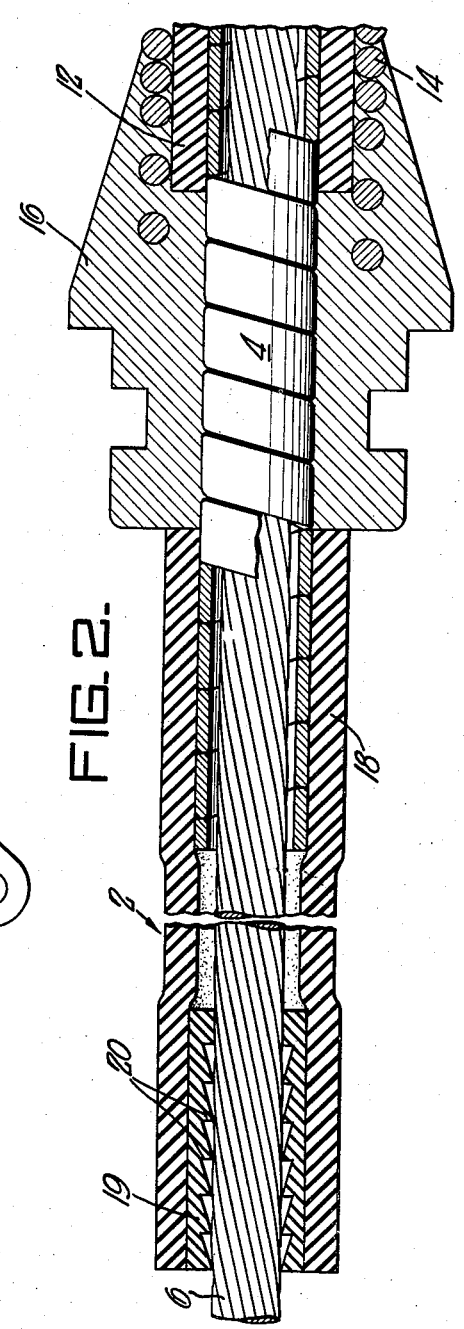
Inventor:
ALAN E. BRICKMAN,
by: Donald G. Dalton
his Attorney.

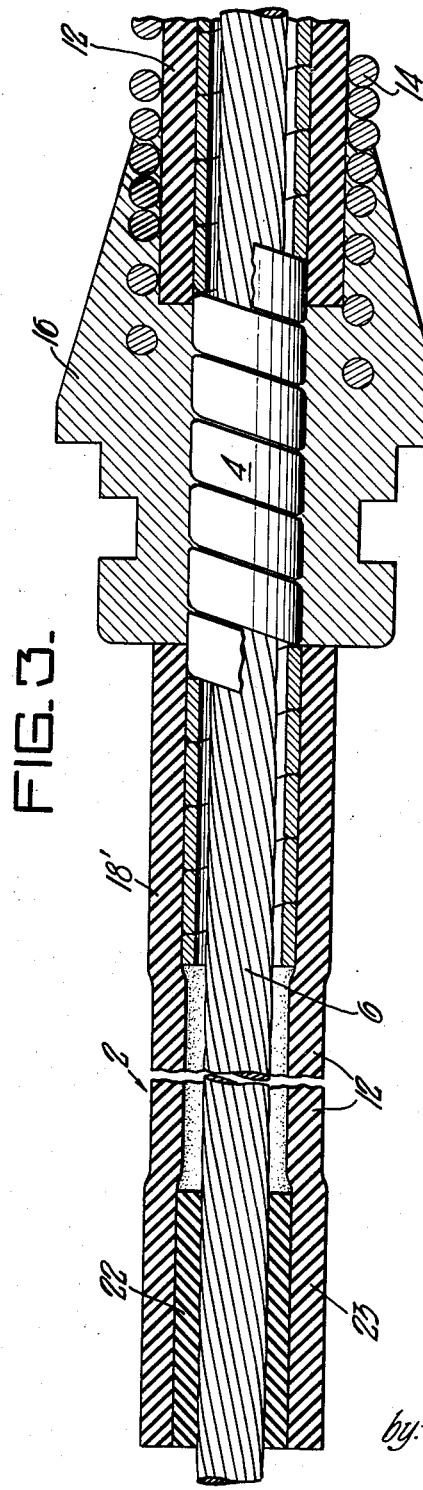

2,858,708

FLEXIBLE CONDUIT

Alan E. Brickman, Williamsville, N. Y., assignor to United States Steel Corporation, a corporation of New Jersey Application February 16, 1954, Serial No. 410,691

3 Claims. (Cl. 74—501)

This invention relates to a flexible conduit and is a continuation-in-part of my copending application, Serial No. 163,631, filed May 23, 1950, now Patent No. 2,691,900, dated October 19, 1954. The conduit is particularly adapted for use as a conduit for brake control cables. Various types of conduits have been provided for this purpose. For example, the patents to Brickman No. 2,046,545 and Reissue No. 21,006 disclose similar conduits while the patent to Brickman No. 2,092,830 discloses the use of such conduits with brake control cables. The invention relates in particular to brake control conduits such as those disclosed in my prior Patents Nos. 2,550,669 and 2,550,670. In brake control assemblies now in use, separate flexible seals are provided between the end of the conduit and the steel brake cable. These seals fit over the outside of the end fitting on the conduit so that they increase the diameter of the assembly. When the conduit is assembled on the automobile, it is threaded through openings in brackets on the frame, which openings are only slightly larger than the outside diameter of the end fittings on the conduit. Because of this arrangement it is very difficult to apply the flexible seals to the ends of the conduits.

It is therefore an object of my invention to provide a brake cable conduit having a flexible seal at the end thereof, which conduit can be quickly applied to the frame of the vehicle.

This and other objects will be more apparent after referring to the following specification and attached drawings, in which:

Figures 1 and 1a taken together show a brake cable assembly embodying my invention;

Figure 2 is an enlarged sectional view of the end of the conduit and brake cable showing the flexible seal; and Figure 3 is an enlarged sectional view, similar to Figure 2, showing a slight modification of my invention.

Referring more particularly to the drawings, the reference numeral 2 indicates a flexible conduit made from a flat hard rolled wire 4 which is spirally wound in the manner described in my above mentioned copending application to provide a hollow core member or tube through which a brake cable 6 passes. A jacket 12 of rubber, neoprene, nylon, or other flexible material, is then extruded or strip insulated on the member 4. The outer interstices between the convolutions are larger than the corresponding inner interstices and the jacket 12 will flow into the outer interstices, thus increasing the bond between the jacket and member 4. The rubber covering 12 is then stripped from one end of the conduit and a helically wound coil spring 14 is placed over a portion of the rubber covering 12 and also over part of the bared portion of the conduit as shown in Figure 2. A terminal fitting 16 is then die cast or swaged over part of the bared portion of member 4, over part of the rubber covering 12 and part of the spring 14, as shown in the drawings. Part of the bare length of the core 4 extends beyond the die cast fitting 16. A flexible tubular rubber seal 18 is expanded and pulled over the end of the core member 4 until its end abuts the fitting 16. When thus expanded over the core member, a portion of the rubber will be forced into the outer interstices of the tubular metallic core member 4, thereby holding the seal 18 on the core member. The seal 18 has an inside diameter greater than the outside diameter of the cable over a portion of its length and a reduced inside diameter portion 19 at its free end which acts as a wiper. While the reduced portion 19 is shown as a separate piece it may be integral with the main portion of the seal 18. Preferably this portion 19 is provided with a plurality of flexible saw teeth 20 so that there are a plurality of wiping edges with openings therebetween for receiving dirt which may be on the cable. In this manner abrasion on the cable is eliminated.

In the embodiment of Figure 3, the portion 19 is provided by cementing a short length of tubing 22 to the inside of the main portion 23 of the seal 18'. The tubing 22 has an internal diameter slightly less than the external diameter of cable 6 and an external diameter slightly greater than the internal diameter of tubing 18.

In making up a brake cable assembly the rubber seal 18 or 18' is drawn on the cable ahead of the conduit assembly and is then drawn back over the exposed length of the metallic core 4. The movement of the cable 6 is relatively small and the seal 18 will expand and collapse an amount sufficient to permit such movement with respect to the main portion of the conduit without relative movement between the cable and the tube 20. The cable 6 is provided with a threaded fitting 24 at one end thereof which is connected to actuating mechanism (not shown) and a fitting 26 at the opposite end thereof which is connected to the brake. A bracket 28 has one end attached to the vehicle and the other end surrounding the conduit 2 to furnish a support for the same.

In both embodiments the square edge portion on the inner end of the reduced diameter portions 19 acts as a cable wipe to retain the grease in the conduit 2 and in the grease reservoir between the ends of conduit 2 and portions 19. The reduced diameter portions 19 also prevent dirt and water from entering the conduit 2.

While two embodiments of my invention have been shown and described it will be apparent that other adaptations and modifications may be made without departing from the scope of the following claims.

I claim:

1. A flexible conduit for a cable comprising a spirally wound metallic core, a flexible jacket surrounding said metallic core for a portion of its length, one end of said metallic core being uncovered, a fitting integrally secured to the uncovered end of said core with a portion of said uncovered end extending therefrom, a flexible tubular seal secured to said last named portion and extending therefrom away from said fitting, said seal having an outside diameter not exceeding the outside diameter of said fitting whereby the assembly may be threaded through an opening only slightly larger than the outside diameter of said fitting, said seal having an inside diameter greater than the outside diameter of the cable over a portion of its length and a portion at its free end of such diameter as to grip the cable firmly.

2. A flexible conduit for a cable according to claim 1 in which the free end portion of the seal has a series of wiping edges spaced apart longitudinally thereof.

3. A flexible conduit for a cable comprising a spirally wound metallic core, a flexible jacket surrounding said metallic core for a portion of its length, one end of said metallic core being uncovered, a fitting integrally secured to the uncovered end of said core with a portion of said uncovered end extending therefrom, a flexible tubular seal secured to said last named portion and extending therefrom away from said fitting, said seal having an outside diameter not exceeding the outside diameter of said fitting whereby the assembly may be threaded through an opening only slightly larger than the outside diameter of said fitting, said seal having an inside diameter greater than the outside diameter of the cable, and a tubular member fastened to the inside of the free end of said seal.

References Cited in the file of this patent
UNITED STATES PATENTS

| | | |
|---|---|---|
| 1,845,683 | Saunders | Feb. 16, 1932 |
| 1,875,936 | Saunders | Sept. 6, 1932 |
| 2,517,717 | Rose | Aug. 8, 1950 |
| 2,550,669 | Brickman | May 1, 1951 |
| 2,691,900 | Brickman | Oct. 19, 1954 |